US012410715B2

(12) United States Patent
Mehrtens et al.

(10) Patent No.: US 12,410,715 B2
(45) Date of Patent: Sep. 9, 2025

(54) ROTOR BLADE SYSTEM FOR TURBINE ENGINES

(71) Applicant: General Electric Company, Schenectady, NY (US)

(72) Inventors: Keegan Nathaniel Mehrtens, Peabody, MA (US); Yoon Seok Choi, Kenwood, OH (US); Ramakrishna Mallina, Mason, OH (US); Robert Bruce Dickman, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/447,831

(22) Filed: Aug. 10, 2023

(65) Prior Publication Data

US 2025/0052160 A1 Feb. 13, 2025

(51) Int. Cl.
*F01D 5/14* (2006.01)

(52) U.S. Cl.
CPC ........ *F01D 5/141* (2013.01); *F05D 2240/303* (2013.01); *F05D 2240/304* (2013.01); *F05D 2240/307* (2013.01); *F05D 2250/25* (2013.01)

(58) Field of Classification Search
CPC ............... F01D 5/141; F05D 2240/303; F05D 2240/304
See application file for complete search history.

(56) References Cited

U.S. PATENT DOCUMENTS 2,582,107 A 1/1952 Dakin
5,031,313 A * 7/1991 Blair ...................... B23P 6/002 29/402.06
5,167,489 A * 12/1992 Wadia ...................... F02K 3/04 415/218.1
5,642,985 A * 7/1997 Spear ...................... F01D 5/141 415/181
6,428,278 B1 8/2002 Montgomery et al.
7,794,202 B2 * 9/2010 Borthwick .............. F01D 5/142 416/243
8,967,974 B2 3/2015 Garcia-Crespo
9,097,125 B2 8/2015 Ghorbani Zarimahalleh et al.
(Continued)

FOREIGN PATENT DOCUMENTS

EP 3075955 A1 10/2016
EP 3208467 B1 3/2021

OTHER PUBLICATIONS

Choi et al., "Analysis of Structural Mistuning Effects on Bladed Disc Vibrations Including Aerodynamic Damping," International Compressor Engineering Conference, School of Mechanical Engineering, Paper 1627 (2004).
(Continued)

*Primary Examiner* — Michael L Sehn
(74) *Attorney, Agent, or Firm* — McCarter & English, LLP

(57) ABSTRACT

A rotor blade system for a turbine engine having a longitudinal centerline axis. The rotor blade system includes a rotor configured to rotate about the longitudinal centerline axis and a plurality of rotor blades coupled circumferentially around the rotor, each rotor blade having a leading edge, a trailing edge, a suction side, and a pressure side. At least one rotor blade of the plurality of rotor blades has an axial sweep of both the leading edge and the trailing edge as compared to a base blade of the plurality of rotor blades.

18 Claims, 7 Drawing Sheets

(56) References Cited

U.S. PATENT DOCUMENTS

| | | | |
|---|---|---|---|
| 9,429,026 | B2 | 8/2016 | Schreiber |
| 10,584,591 | B2 | 3/2020 | Opoka et al. |
| 10,808,541 | B2 | 10/2020 | Bales et al. |
| 10,837,459 | B2 | 11/2020 | Veitch et al. |
| 10,851,655 | B2 | 12/2020 | Gonzalez-Gutierrez |
| 11,002,293 | B2 | 5/2021 | Anand et al. |
| 11,220,913 | B2 | 1/2022 | Molnar, Jr. |
| 11,371,357 | B2 | 6/2022 | De Gaillard et al. |

OTHER PUBLICATIONS

Ren et al., U.S. Appl. No. 17/661,796, filed May 3, 2022.
Andreoli et al., U.S. Appl. No. 17/649,030, filed Jan. 26, 2022.

* cited by examiner

ROTOR BLADE SYSTEM FOR TURBINE ENGINES

TECHNICAL FIELD

The present disclosure relates generally to a rotor blade system for turbine engines.

BACKGROUND

A turbine engine generally includes a fan and a core arranged in flow communication with one another. The core includes one or more turbines and one or more compressors. The turbines and compressors include one or more stages, with each stage including rotor blades and stator vanes.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
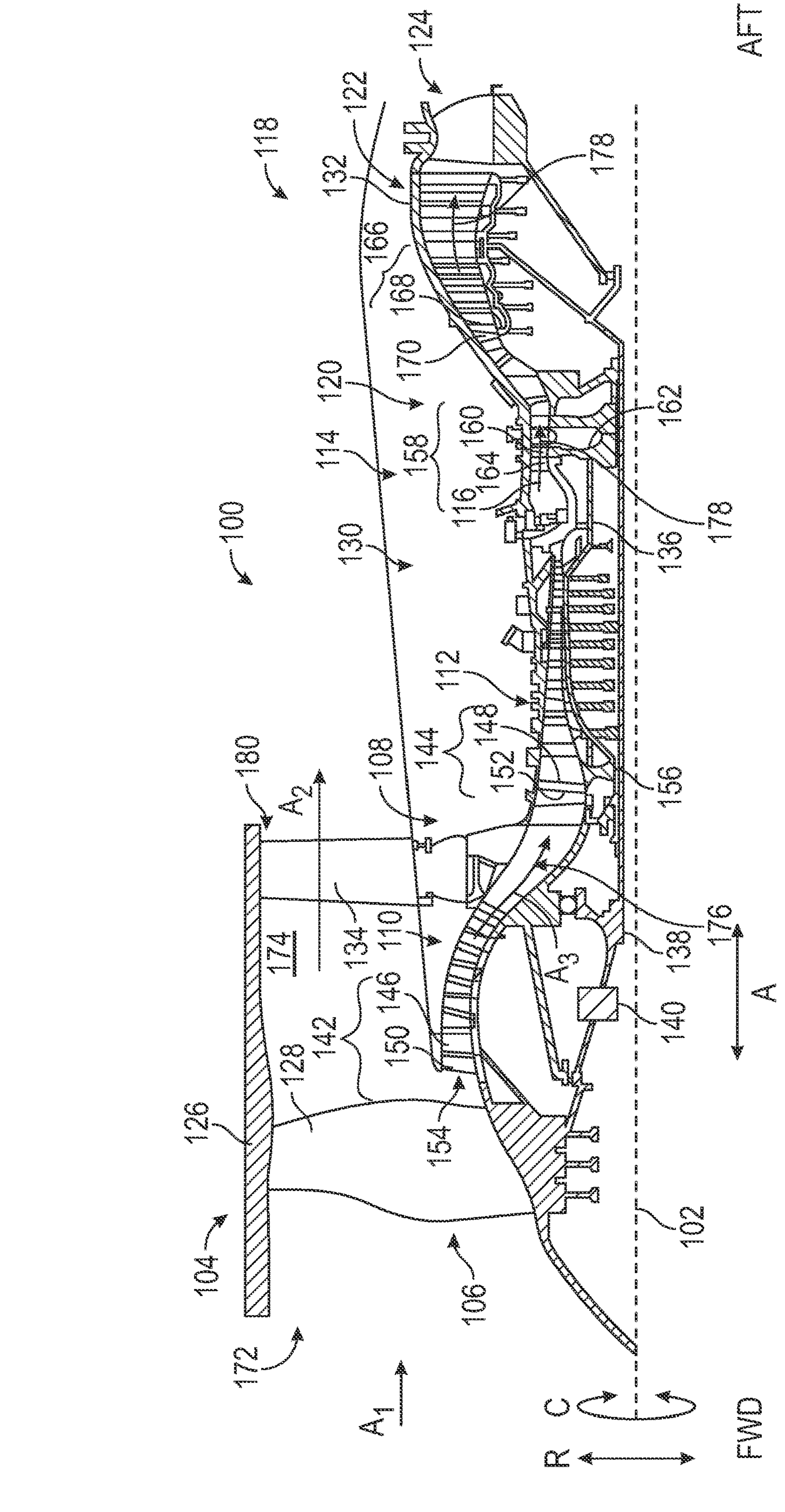
FIG. 1 illustrates a schematic, cross-sectional view of a ducted, indirect-drive gas turbine engine, taken along a longitudinal centerline axis of the engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Turbine engines include rotor blade systems that comprise a plurality of rotor blades in turbines and compressors. During rotation of the rotor blades, a vibratory mode exists where all of the rotor blades vibrate. By mistuning the rotor blades, a uniform vibratory mode of the rotor blades can be disrupted, thus, reducing the overall vibration level in the rotor blade system. The mistuning causes a non-uniformity in the vibratory mode, which reduces the vibratory response. The mistuning takes the form of a blade sweep in the axial direction, the circumferential direction, or both the axial and the circumferential direction. The blade sweep occurs without addition or removal of material from the rotor blade or with minimal changes to the geometry of the airfoil of the rotor blade (e.g., within ten percent of the chord length or within twenty-five percent of the blade thickness, or both).

FIG. 1 shows a schematic, cross-sectional view of a turbine engine 100, taken along a longitudinal centerline axis 102 of the turbine engine 100, according to an embodiment of the present disclosure. The turbine engine 100 includes, in a downstream serial flow relationship, a fan section 104 including a fan 106, a compressor section 108 including a booster or a low-pressure (LP) compressor 110 and a high-pressure (HP) compressor 112, a combustion section 114 including a combustor 116, a turbine section 118 including a high-pressure (HP) turbine 120, a low-pressure (LP) turbine 122, and an exhaust nozzle 124. As shown in FIG. 1, the turbine engine 100 defines an axial direction A, a radial direction R, and a circumferential direction C. As shown and described herein, the turbine engine 100 is a ducted, indirect-drive, gas turbine engine 100.

The fan section 104 includes a fan casing 126, which is secured to a nacelle (omitted for clarity) surrounding the fan 106. The fan 106 includes a plurality of fan blades 128 disposed radially about the longitudinal centerline axis 102. The HP compressor 112, the combustor 116, and the HP turbine 120 form an engine core 130 of the turbine engine 100, which generates combustion gases. The engine core 130 is surrounded by a core casing 132, which is coupled to the fan casing 126. The fan casing 126 is supported relative to the turbomachine by circumferentially spaced outlet guide vanes 134.

A high-speed shaft 136, also referred to herein as a high-pressure shaft 136, is disposed coaxially about the longitudinal centerline axis 102 of the turbine engine 100 and drivingly connects the HP turbine 120 to the HP compressor 112. A low-speed shaft 138, also referred to herein as a low-pressure shaft 138, which is disposed coaxially about the longitudinal centerline axis 102 of the turbine engine 100 and within the larger diameter, annular, high-speed shaft 136, drivingly connects the LP turbine 122 to the LP compressor 110 and the fan 106 (either directly or indirectly through a gearbox assembly 140). The high-speed shaft 136 and the low-speed shaft 138 are rotatable about the longitudinal centerline axis 102.

The LP compressor 110 and the HP compressor 112, respectively, include a respective plurality of compressor stages 142, 144, in which a respective set of compressor blades 146, 148 rotate relative to a respective set of compressor vanes 150, 152 to compress or to pressurize gas entering through an inlet 154. Each compressor stage 144 of the HP compressor 112 includes multiple compressor blades 148 provided on a rotor disk 156 (or the blades and the disk are integrated together, referred to as a blisk), also referred to herein as rotor compressor blades 148 or rotor blades 148. Each compressor blade 148 extends radially outwardly relative to the longitudinal centerline axis 102, from a blade platform to a blade tip. Compressor vanes 152, also referred to herein as stator vanes 152, are positioned upstream/downstream of and adjacent to rotor compressor blades 148. The rotor disk 156 for a stage of compressor blades 148 is mounted to the high-speed shaft 136. The compressor stage 144 of the HP compressor 112 may refer to a single disk of rotor compressor blades 148 or may refer to both the single disk of rotor compressor blades 148 and an adjacent single disk of stator vanes 152. Either meaning can apply within the context of this disclosure without loss of clarity. The same description applies to each compressor stage 142 of the LP compressor 110 (e.g., each compressor stage 142 of the LP compressor 110 includes multiple compressor blades 146, also referred to as rotor blades 146, and stator compressor vanes 150).

The HP turbine 120 has one or two turbine stages 158. In a single turbine stage 158, turbine blades 160 are provided on a rotor disk 162, also referred to herein as rotor blades 160. Each turbine blade 160 extends radially outwardly relative to the longitudinal centerline axis 102, from a blade platform to a blade tip. The HP turbine 120 can also include stator turbine vanes 164, also referred to as stator turbine nozzles. The HP turbine 120 may have an upstream nozzle adjacent an exit of the combustor 116 and a downstream nozzle aft of the rotor (e.g., turbine blades 160) or the HP turbine 120 may have a nozzle upstream of the rotor blades (e.g., turbine blades 160) or downstream of the rotor blades.

Air exiting the HP turbine 120 enters the LP turbine 122, which has a plurality of turbine stages 166 of rotor blades 168. The LP turbine 122 can have three, four, five, or six stages. In a single LP turbine stage 166 (containing a plurality of rotor blades 168 coupled to the low-speed shaft 138), the rotor blades 168 are provided on a rotor disk (connected to the low-speed shaft 138) and extend radially outwardly relative to the longitudinal centerline axis 102, from a blade platform to a blade tip. The LP turbine 122 can also include stator turbine vanes 170, also referred to as a stator turbine nozzle. The LP turbine 122 may have both an upstream nozzle and a downstream nozzle aft of a turbine stage 166, followed by the exhaust nozzle 124.

During operation of the turbine engine 100, a volume of air A1 enters the turbine engine 100 through an inlet 172 of the fan casing 126. As the volume of air A1 passes through the fan section 104 and across the fan blades 128, a first portion of air A2 of the air A1 is directed or routed into a bypass air flow passage 174 and a second portion of air A3 of the air A1 is directed or routed into the inlet 154 at an upstream section of a core air flow passage 176. The ratio between the first portion of air A2 and the second portion of air A3 is commonly known as a bypass ratio. The pressure of the second portion of air A3 is then increased as it is routed through the HP compressor 112 and into the combustion section 114, where the highly pressurized air is mixed with fuel and burned to provide combustion gases 178.

The combustion gases 178 are routed into the HP turbine 120 and expanded through the HP turbine 120 where a portion of thermal and/or kinetic energy from the combustion gases 178 is extracted via sequential stages of the HP turbine 120 turbine vanes 164 and rotor blades 160, which are coupled to the high-speed shaft 136, thus causing the high-speed shaft 136 to rotate, thereby supporting operation of the HP compressor 112. The combustion gases 178 are then routed into the LP turbine 122 and expanded through the LP turbine 122. Here, a second portion of thermal and kinetic energy is extracted from the combustion gases 178 via sequential stages of the LP turbine 122 turbine vanes 170 and the LP turbine rotor blades 168 that are coupled to the low-speed shaft 138, thus, causing the low-speed shaft 138 to rotate. The rotation of the low-speed shaft 138 thereby supports operation of the LP compressor 110 and rotation of the fan 106 (via the gearbox assembly 140, when present).

The combustion gases 178 are subsequently routed through the exhaust nozzle 124 to provide propulsive thrust. Simultaneously, the pressure of the first portion of air A2 is substantially increased as the first portion of air A2 is routed through the bypass air flow passage 174 before being exhausted from a fan nozzle exhaust 180, also providing propulsive thrust.

The turbine engine 100 is by way of example only. In other embodiments, the gas turbine engine may have any other suitable configuration, including, for example, any other suitable number or configurations of shafts or spools, fan blades, turbines, compressors, or a combination thereof. The gearbox assembly 140 may have any suitable configuration, including, for example, a star gear configuration, a planet gear configuration, a single-stage, a multi-stage, epicyclic, non-epicyclic, etc., as detailed further below. The gearbox assembly 140 may have a gear ratio in a range of 3:1 to 4:1, 3:5 to 4:1, 3.25:1 to 3.5:1, or 4:1 to 5:1. The fan assembly may be any suitable fixed-pitched assembly or variable-pitched assembly. The turbine engine 100 may include additional components not shown in FIG. 1, such as rotor blades, stator vanes, etc. The fan assembly may be configured in any other suitable manner (e.g., as a fixed pitch fan) and further may be supported using any other suitable fan frame configuration. Aspects of the present disclosure may be incorporated into any other suitable turbine engine, including, but not limited to, turbofan engines, propfan engines, turbojet engines, turboprop, and turboshaft engines, aviation-based turbine engines, marine-based turbine engines, land-based turbine engines, industrial turbine engines, power generation turbine engines, etc.

As noted, the high-pressure compressors and turbines and the low-pressure compressors and turbines include one or more stages each having two types of blades: stator blades and rotor blades. The blades, whether stator or rotor, are arranged in a circumferential manner about the longitudinal centerline axis 102 (FIG. 1). That is, each stage of the compressor and the turbine is associated with a ring or a circumferential row of stator blades and a ring or a circumferential row of rotor blades. The rotor blades or the stator blades are axisymmetric about the longitudinal centerline axis 102.

Figure 2:
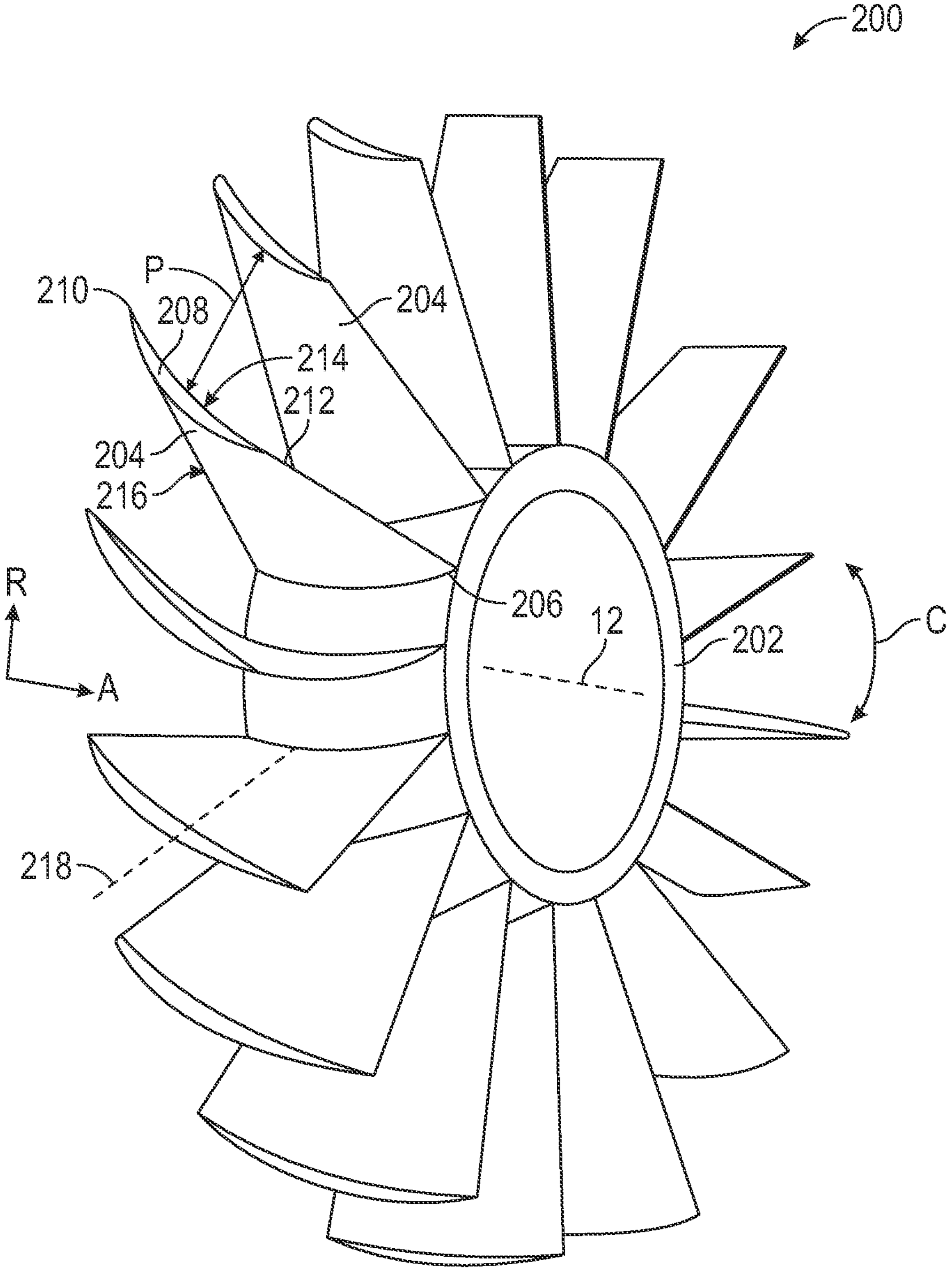
FIG. 2 illustrates a schematic, perspective view of a rotor blade system, according to the present disclosure.

FIG. 2 is a forward perspective view of a rotor blade system 200 isolated from the turbine engine 100 (FIG. 1), according to the present disclosure. The rotor blade system 200 defines a circumferential direction C and has a rotor 202 and a plurality of rotor blades 204 mounted thereon. The rotor blade system 200 rotates about a longitudinal centerline axis 12, which is aligned with the longitudinal centerline axis 102 of the turbine engine 100 (FIG. 1). The rotor blade system 200 may be one or more of the fan 106 with fan blades 128, the LP compressor 110 with rotor blades 146, the HP compressor 112 with rotor blades 148, the LP turbine 122 with rotor blades 168, or the HP turbine 120 with rotor blades 160. The rotor blade system 200 is equally applicable to industrial gas turbines (IGTs) or power generation turbines. The present rotor blade system is not limited only to turbine engines but can be used in any airfoil system.

The plurality of rotor blades 204 are uniformly and circumferentially spaced about the rotor 202. The rotor blades 204 may be integrally formed with the rotor 202 or may be connected thereto. Each rotor blade 204 is formed of an airfoil and extends from a blade root 206 at the rotor 202 to a blade tip 208 and includes a leading edge 210 and a trailing edge 212. As illustrated in FIG. 2, the airfoil of each rotor blade 204 may have a twist or contour. For example, each rotor blade 204 may be contoured or twisted with respect to a longitudinal blade axis 218 extending from the blade root 206 to the blade tip 208. Each rotor blade 204 includes a pressure side 214 joined to a suction side 216 at the leading edge 210 and at the trailing edge 212. The pressure side 214 is concave and the suction side 216 is convex.

Adjacent rotor blades 204 have a passage length therebetween, also referred to as an inter-blade spacing therebetween. A pitch P is the inter-blade spacing and is defined as the distance between adjacent rotor blades 204 at the respective blade tips 208. Adjacent rotor blades are defined as two rotor blades 204 with no intervening rotor blade 204 therebetween.

One or more of the rotor blades 204 may be mistuned without removal of material or addition of material from the rotor blades 204, or with minimal removal or addition (e.g., within ten percent). That is, one or more of the rotor blades 204 may include a blade sweep extending from a blade tip toward a blade root. The blade sweep, also referred to as blade shift, achieves blade mistuning with no or minimal material removal or addition and no or minimal (e.g., with ten percent) change in blade weight.

In some examples, all rotor blades 204 may be mistuned according to one or more of the embodiments described with respect to FIGS. 3A to 8. In some examples, the mistuning of the rotor blades 204 may be a predetermined patterned arrangement, which may be a predetermined grouped arrangement or a predetermined alternating arrangement. That is, for example, when fewer than all rotor blades 204 are mistuned, the mistuning may be according to a predetermined arrangement. For example, the rotor blades 204 may take on any number of patterns including, but not limited to, "AB" patterns, "AAB" patterns, "ABB" patterns, "ABC" patterns, "AABC" patterns, "AABBC" patterns, "AABBCC" patterns, etc., or combinations thereof, where A is a base blade, and each of B and C are mistuned blades. Although the pattern describes only two types of mistuned blades, more types may be provided (e.g., D, E, F, etc.) such that multiple exemplary embodiments of mistuned blades may be present in the rotor blade system 200. B and C (and D, E, F, etc.) represent differently mistuned rotor blades (e.g., different rotor blades according to FIGS. 3A to 8). In another example, the predetermined grouped arrangement may comprise a subset of mistuned rotor blades arranged adjacent to one another and located at a single location about the rotor 202 of the rotor blade system 200. For example, a predetermined group of mistuned rotor blades may be located from, with respect to a clockwise direction of a clock arrangement, a twelve o'clock position to three o'clock position with the base rotor blades located from the three o'clock position (clockwise) to the twelve o'clock position. This is simply exemplary, and any grouping of mistuned rotor blades is contemplated.

FIGS. 3A to 8 illustrate exemplary embodiments of rotor blades that may be employed as one or more of the rotor blades 204. As described below, the blades include blade sweeps in one or more directions. In some examples, the blades include axial blade sweeps, circumferential blade sweeps, or both axial blade sweeps and circumferential blade sweeps. The mistuning provided in FIGS. 3A to 8 allows for aero-damping to reduce non-synchronous responses. The rotor blades of FIGS. 3A to 8 are illustrated schematically and, thus, do not illustrate the curvature as shown with respect to FIG. 2. However, this is for simplicity in description only and it is understood that the rotor blades of FIGS. 3A to 8 also include curvature such as shown in FIG. 2.

FIGS. 3A, 3B, 4A, and 4B illustrate rotor blades exhibiting axial blade sweep of a leading edge and a trailing edge. As described in more detail below, the axial blade sweep is defined as an axial change of the leading edge or trailing edge with respect to a leading edge or a trailing edge of a base blade, respectively. The axial blade sweep results in a leading edge or a trailing edge of the rotor blade being located farther forward or farther aft as compared to the base blade. In the embodiments described herein, the axial sweep occurs over a portion of a span length of the rotor blade. That is, the base blade is substantially linear with respect to a lower portion of the leading edge or trailing edge and the swept blade is nonlinear with respect to the leading edge or trailing edge above the lower portion.

Figure 3A:
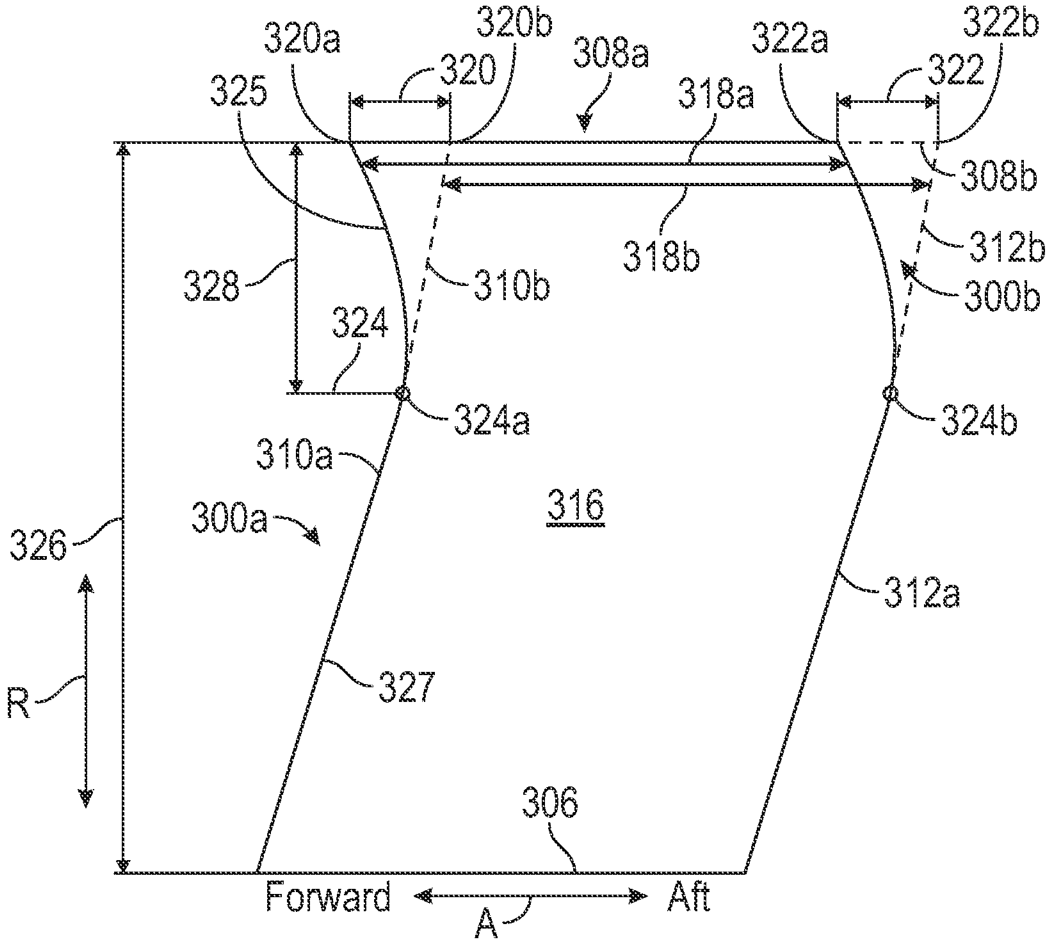
FIG. 3A illustrates a schematic, suction side view of a rotor blade, which may be a rotor blade of the rotor blade system of FIG. 2, according to the present disclosure.
Figure 3B:
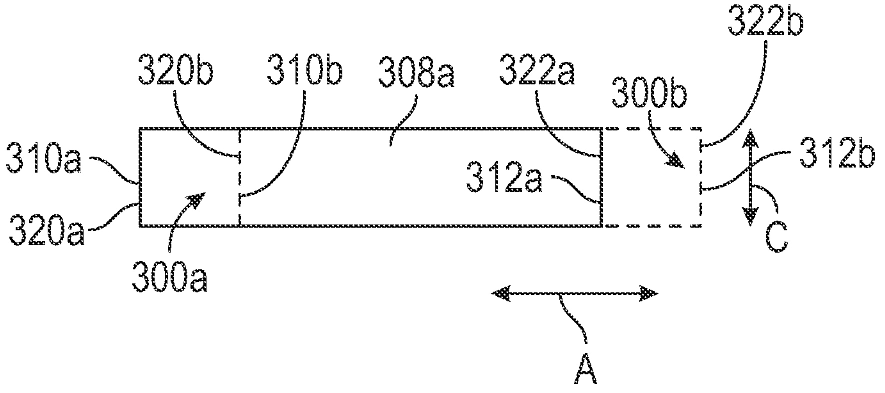
FIG. 3B illustrates a schematic, blade tip view of the rotor blade of FIG. 3A, according to the present disclosure.

FIGS. 3A and 3B illustrate a rotor blade 300*a* having a blade tip 308*a*, a blade root 306, a leading edge 310*a*, and a trailing edge 312*a*. A chord length 318*a* is defined between the leading edge 310*a* and the trailing edge 312*a* at the blade tip 308*a*. As shown in FIG. 2, the chord length 318*a* may not be a linear measurement due to the curvature of the rotor blade 300*a*. The view of FIG. 3A illustrates a suction side 316 of the rotor blade 300*a*. FIG. 3B illustrates a view of the blade tip 308*a*. As illustrated in FIGS. 3A and 3B, the blade tip 308*a* of the leading edge 310*a* is swept in the axial direction A (as defined in FIGS. 1 and 2) toward the forward end of the turbine engine 100 (FIG. 1). The axial sweep is in relation to a base blade 300*b*. The base blade 300*b* has a base blade leading edge 310*b*, a base blade trailing edge 312*b*, a base blade tip 308*b*, and a base blade root. The base blade tip 308*b* and the blade tip 308*a* are coplanar. The base blade root and the blade root 306 are coplanar. At the blade root 306, the leading edge and the trailing edge of each of the base blade 300*b* and the rotor blade 300*a* are at the same axial location and there is no axial sweep.

FIG. 3A illustrates the leading edge 310*a* substantially collinear with respect to the base blade leading edge 310*b* along a lower portion 327 of the leading edge 310*a* that extends from the blade root 306 to a sweep point 324*a*. After the sweep point 324*a*, along an upper portion 325 of the leading edge 310*a*, the leading edge 310*a* is not collinear with respect to the base blade leading edge 310*b*. Thus, the sweep point 324*a* defines a point at which the leading edge 310*a* diverges from the base blade leading edge 310*b*. Likewise, the trailing edge 312*a* is substantially collinear with respect to the base blade trailing edge 312*b* along a lower portion of the trailing edge 312*a* that extends from the blade root 306 to a sweep point 324*b*. After the sweep point 324*b* and extending from the sweep point 324*b* to the blade tip 308*a*, the trailing edge 312*a* is not collinear with respect to the base blade trailing edge 312*b*. Thus, the sweep point 324*b* defines a point at which the trailing edge 312*a* diverges from the base blade trailing edge 312*b*.

As mentioned, the leading edge 310*a* is swept in the axial direction A toward the forward end of the turbine engine 100 (FIG. 1). "Axial sweep" means that the leading edge 310*a* is axially farther in the forward direction than the base blade leading edge 310*b*. As noted above, the axial sweep of the leading edge 310*a* occurs from the sweep point 324*a* to the blade tip 308*a*. Likewise, the trailing edge 312*a* is swept in the axial direction A toward the forward end of the turbine engine 100 (FIG. 1) as compared to the base blade trailing edge 312*b*. The axial sweep of the trailing edge 312*a* occurs from the sweep point 324*b* to the blade tip 308*a*. The sweep of the leading edge 310*a* and the trailing edge 312*a*, is such that the chord length 318*a* defined between the leading edge 310*a* and the trailing edge 312*a* is maintained constant with respect to a base blade chord length 318*b* of the base blade 300*b*. A constant chord length 318*a* is a chord length that is within ten percent (either greater or lesser) of the base blade chord length 318*b* defined between the base blade leading edge 310*b* and the base blade trailing edge 312*b*. In some examples, the chord length 318*a* is equal to the base blade chord length 318*b*. By maintaining a constant chord length 318*a*, the rotor blade 300*a* performs about the same amount (e.g., within ten percent) of work as the base blade 300*b*, while benefiting from the mistuning properties that disrupt the vibrational mode.

At the blade tip 308*a*, the amount that the leading edge 310*a* is swept in the axial direction A is equal to a leading edge axial chord sweep 320. The leading edge axial chord sweep 320 is defined between a leading tip edge 320*a* and a base blade leading tip edge 320*b*. Referring to FIGS. 3A and 3B, the leading tip edge 320*a* is a substantially circumferentially extending edge of the blade tip 308*a* at the leading edge 310*a* and the base blade leading tip edge 320*b* is a circumferentially extending edge of the base blade tip 308*b* at the base blade leading edge 310*b*. By "substantially circumferentially" it is meant that the edge extends more in the circumferential direction than in either of the radial or axial directions. Similarly, at the blade tip 308*a*, the amount that the trailing edge 312*a* is swept in the axial direction A is equal to a trailing edge axial chord sweep 322. The trailing edge axial chord sweep 322 is defined between a trailing tip edge 322*a* and a base blade trailing tip edge 322*b*. Referring to FIGS. 3A and 3B, the trailing tip edge 322*a* is a substantially circumferentially extending edge of the blade tip 308*a* at the trailing edge 312*a* and the base blade trailing tip edge 322*b* is a circumferentially extending edge of the base blade tip 308*b* at the base blade trailing edge 312*b*.

The leading edge axial chord sweep 320 and the trailing edge axial chord sweep 322 may increase from the sweep points 324*a*, 324*b* to the blade tip 308*a*. That is, the distance between the leading edge 310*a* and the base blade leading edge 310*b* may increase from the sweep point 324*a* to the blade tip 308*a* or the distance may be constant. Likewise with the trailing edge axial chord sweep 322. In some examples, the leading edge axial chord sweep 320 and the trailing edge axial chord sweep 322 are equal. In some examples, the leading edge axial chord sweep 320 and the trailing edge axial chord sweep 322 are different, while maintaining the chord length 318*a* within ten percent of the base blade chord length 318*b*. The leading edge axial chord sweep 320 is from greater than zero percent to fifteen percent of the chord length 318*a*, and, preferably, from five percent to ten percent of the chord length 318*a*. The trailing edge axial chord sweep 322 is from greater than zero percent to fifteen percent of the chord length 318*a*, preferably, from five percent to ten percent of the chord length 318*a*.

A span length 326 is defined between the blade tip 308*a* and the blade root 306. The axial sweep of the leading edge 310*a* and the trailing edge 312*a* may extend from an axis 324 to the blade tip 308*a*. The axis 324 extends through the sweep point 324*a* (e.g., the point at which the leading edge 310*a* and the trailing edge 312*a* are no longer swept and are collinear with, respectively, the base blade leading edge 310*b* and the base blade trailing edge 312*b*). The percentage of the span length 326 of the rotor blade 300*a* that exhibits the axial blade sweep is defined by a radial distance 328 between the blade tip 308*a* and the axis 324. The radial distance 328 is from greater than zero percent to forty percent of the span length 326. In some examples, the radial distance is from five percent to twenty-five percent of the span length 326 of the rotor blade 300*a*. In some examples, the radial distance is twenty-five percent of the span length 326 of the rotor blade 300*a*.

Figure 4A:
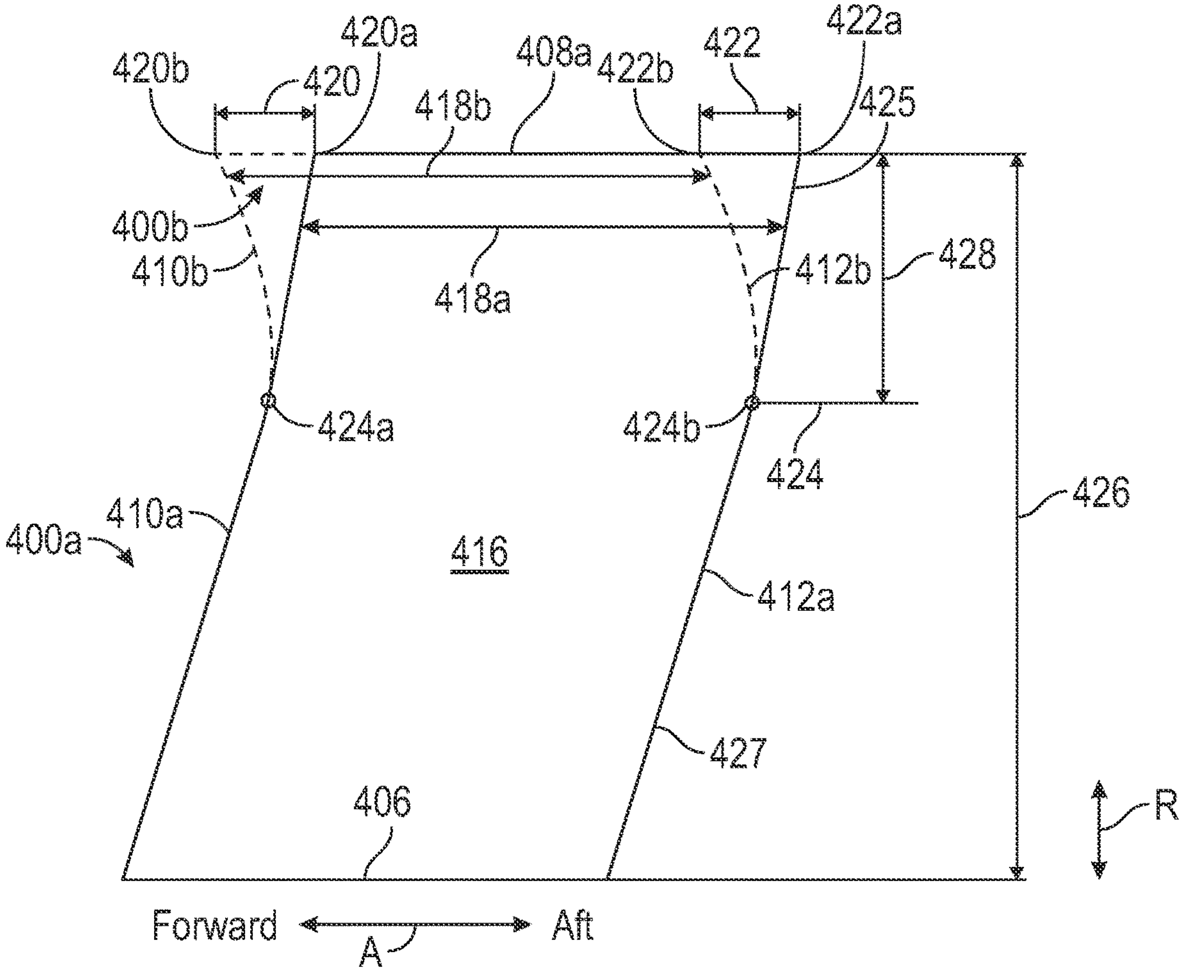
FIG. 4A illustrates a schematic, suction side view of a rotor blade, which may be a rotor blade of the rotor blade system of FIG. 2, according to the present disclosure.
Figure 4B:
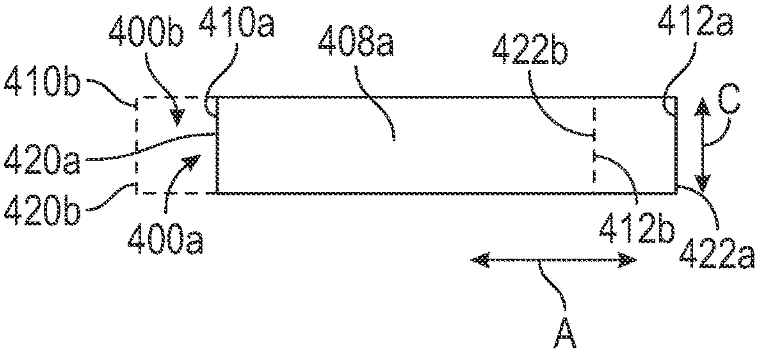
FIG. 4B illustrates a schematic, blade tip view of the rotor blade of FIG. 4A, according to the present disclosure.

FIGS. 4A and 4B illustrate a rotor blade 400*a*, having a blade tip 408*a*, a blade root 406, a leading edge 410*a*, and a trailing edge 412*a*. FIG. 4A illustrates a suction side 416 of the rotor blade 400*a*. FIG. 4B illustrates a view of the blade tip 408*a*. The rotor blade 400*a* is equal to the rotor blade 300*a*, except that the leading edge 410*a* and the trailing edge 412*a* of the rotor blade 400*a* are swept in the axial direction A toward the aft end of the turbine engine 100 (FIG. 1). Accordingly, the full description of FIGS. 3A and 3B applies to FIGS. 4A and 4B, except for the direction of the axial sweep.

That is, the leading edge 410*a* and the trailing edge 412*a* are swept in the axial direction by a leading edge axial chord sweep 420 and a trailing edge axial chord sweep 422, respectively, as compared to a base blade leading edge 410*b* and a base blade trailing edge 412*b* of a base blade 400*b*, respectively. The axial chord sweep is defined according to the definition of FIG. 3A. For example, the leading edge axial chord sweep 420 is defined between a leading tip edge 420*a* and a base blade leading tip edge 420*b*. Referring to FIGS. 4A and 4B, the leading tip edge 420*a* is a circumferentially extending edge of the blade tip 408*a* at the leading edge 410*a* and the base blade leading tip edge 420*b* is a circumferentially extending edge of the base blade tip at the base blade leading edge 410*b*. The trailing edge axial chord sweep 422 is defined between a trailing tip edge 422*a* and a base blade trailing tip edge 422*b*. Referring to FIGS. 4A and 4B, the trailing tip edge 422*a* is a circumferentially extending edge of the blade tip 408*a* at the trailing edge 412*a* and the base blade trailing tip edge 422*b* is a circumferentially extending edge of the base blade tip at the base blade trailing edge 412*b*.

In some examples, the leading edge axial chord sweep 420 and the trailing edge axial chord sweep 422 may be equal. In some examples, the leading edge axial chord sweep 420 and the trailing edge axial chord sweep 422 are different, while maintaining a constant chord length, e.g., maintaining a chord length 418*a* within ten percent of a base chord length 418*b*. As noted previously, by maintaining a constant chord length 418*a*, the rotor blade 400*a* performs about the same amount (e.g., within ten percent) of work as the base blade 400*b*, while benefiting from the mistuning properties that disrupt the vibrational mode. The leading edge axial chord sweep 420 is from greater than zero percent to fifteen percent of the chord length 418*a*, preferably, from five percent to ten percent of the chord length 418*a*. The trailing edge axial chord sweep 422 is from greater than zero percent to fifteen percent of the chord length 418*a*, preferably from five percent to ten percent of the chord length 418*a*.

As in FIG. 3A, a sweep point 424*b* exists along the trailing edge 412*a* of the rotor blade 400*a*. The trailing edge 412*a* is substantially collinear with respect to the base blade trailing edge 412*b* along a lower portion 427 of the trailing edge 412*a* that extends from the blade root 406 to a sweep point 424*b*. After the sweep point 424*b* along an upper portion 425, the trailing edge 412*a* is not collinear with respect to the base blade trailing edge 412*b*. Thus, the sweep point 424*b* defines a point at which the trailing edge 412*a* diverges from the base blade trailing edge 412*b*. A sweep point 424*a* is located along the leading edge 410*a* and is defined in the same manner described previously with respect to both FIGS. 3A and 4A.

A span length 426 is defined between the blade tip 408*a* and the blade root 406. The axial sweep of the leading edge 410*a* and the trailing edge 412*a* may extend from an axis 424 to the blade tip 408*a*. The axis 424 extends through the sweep point 424*b* (e.g., the point at which the leading edge 410*a* and the trailing edge 412*a* are no longer swept and are collinear with, respectively, the base blade leading edge 410*b* and the base blade trailing edge 412*b*). The percentage of the span length 426 of the rotor blade 400*a* that exhibits the axial blade sweep is defined by a radial distance 428. The radial distance 428 is defined between the blade tip 408*a* and an axis 424 that extends through the point at which the leading edge 410*a* and the trailing edge 412*a* are no longer swept and are collinear with, respectively, the base blade leading edge 410*b* and the base blade trailing edge 412*b*. The radial distance may be from greater than zero percent to forty percent of the span length 426 of the rotor blade 400*a*. In some examples, the radial distance is from five percent to twenty-five percent of the span length of the rotor blade 400*a*. In some examples, the radial distance is twenty-five percent of the span length of the rotor blade 400*a*.

FIGS. 5A, 5B, 6A, and 6B illustrate rotor blades exhibiting tangential sweep of a suction side and a pressure side in the circumferential direction. That is, the rotor blades of FIGS. 5A, 5B, 6A, and 6B exhibit a sweep in a direction of the pitch P (FIG. 2) and therefore extend into the inter-blade spacing.

Figure 5A:
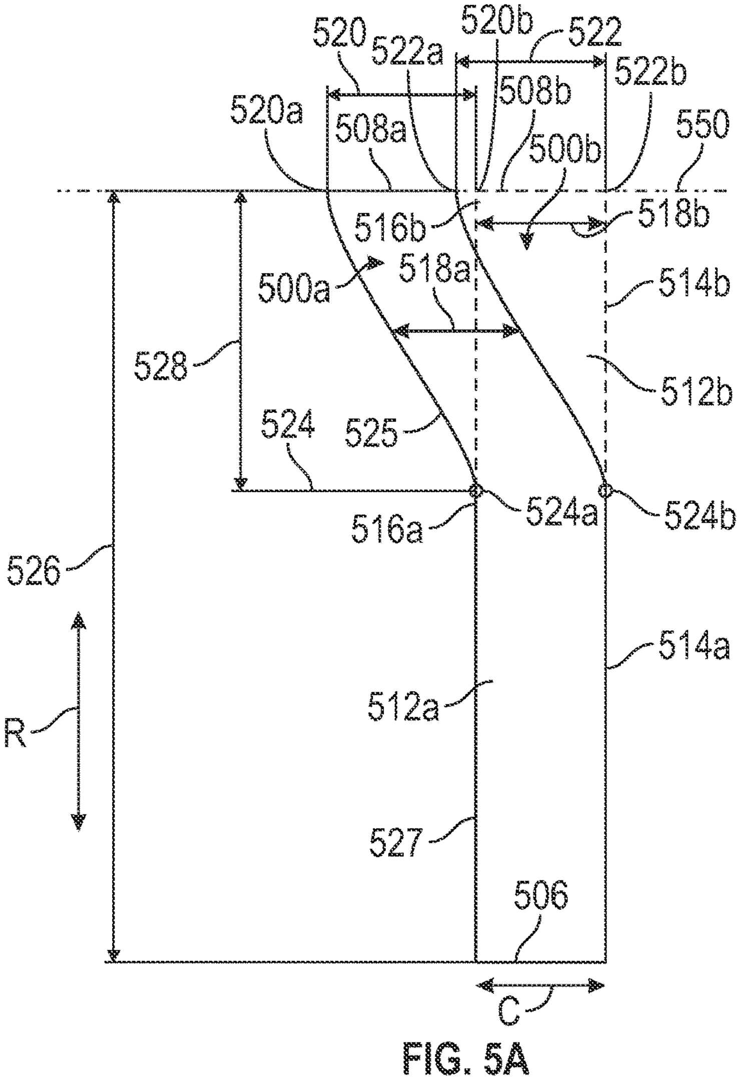
FIG. 5A illustrates a schematic, trailing edge view of a rotor blade, which may be a rotor blade of the rotor blade system of FIG. 2, according to the present disclosure.
Figure 5B:
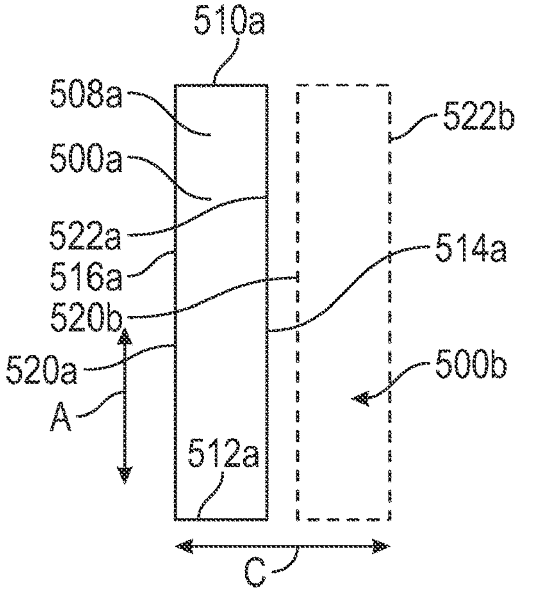
FIG. 5B illustrates a schematic, blade tip view of the rotor blade of FIG. 5A, according to the present disclosure.

FIG. 5A illustrates a rotor blade 500*a* having a blade tip 508*a*, a blade root 506, a leading edge 510*a*, a trailing edge 512*a*, a pressure side 514*a*, and a suction side 516*a*. The view of FIG. 5A illustrates an aft end view of the rotor blade 500*a* such that the leading edge is not visible in this view. FIG. 5B illustrates a view of the blade tip 508*a* taken at a plane 550 such that only the blade tip 508*a* and a base blade tip 508*b* are visible in FIG. 5B. In the example of FIGS. 5A and 5B, the suction side 516*a* is swept in the circumferential direction C (as defined in FIGS. 1 and 2) in the direction opposite of rotation of the turbine engine 100 (FIG. 1). The circumferential sweep is in relation to a base blade 500*b*. The base blade 500*b* has a base blade suction side 516*b*, a base blade pressure side 514*b*, a base blade trailing edge 512*b*, the base blade tip 508*b*, and a base blade root. As in the aspects of FIGS. 3 and 4, the base blade tip 508*b* and the base blade root are collinear with the blade tip 508*a* and the blade root 506, respectively. At the blade root, the leading edge and the trailing edge of each of the base blade 500*b* and the rotor blade 500*a* are at the same axial location and there is no axial sweep.

As mentioned, the suction side 516*a* is swept in the circumferential direction C in the direction opposite of rotation of the turbine engine 100 (FIG. 1). "Circumferential sweep," means that the suction side 516*a* is circumferentially farther in the direction opposite of rotation of the turbine engine 100 (FIG. 1) as compared to the base blade suction side 516*b*. Likewise, the pressure side 514*a* is swept in the circumferential direction C in the direction opposite of the rotation of the turbine engine 100 (FIG. 1) as compared to the base blade pressure side 514*b*. The sweep of the suction side 516*a* and the pressure side 514*a* is such that a chord length (as defined with respect to FIGS. 3A and 3B) is constant (e.g., within ten percent of) between the rotor blade 500*a* and the base blade 500*b* (e.g., as described with respect to FIGS. 3A to 4B). In some examples, a blade thickness 518*a* defined between the suction side 516*a* and the pressure side 514*a* is within twenty-five percent of a blade thickness 518*b* defined between the base blade suction side 516*b* and the base blade pressure side 514*b*. In some examples, the blade thickness 518*a* is equal to the blade thickness 518*b*.

FIG. 5A illustrates the suction side 516*a* substantially collinear with respect to the base blade suction side 516*b* along a lower portion 527 of the suction side 516*a* that extends from the blade root 506 to a sweep point 524*a*. After the sweep point 524*a*, along an upper portion 525 of the suction side 516*a*, the suction side 516*a* is not collinear with respect to the base blade suction side 516*b*. Thus, the sweep point 524*a* defines a point at which the suction side 516*a* diverges from the base blade suction side 516*b*. Likewise, the pressure side 514*a* is substantially collinear with respect to the base blade pressure side 514*b* along a lower portion of the pressure side 514*a* that extends from the blade root 506 to a sweep point 524*b*. After the sweep point 524*b* and extending from the sweep point 524*b* to the blade tip 508*a*, the pressure side 514*a* is not collinear with respect to the base blade pressure side 514*b*. Thus, the sweep point 524*b* defines a point at which the pressure side 514*a* diverges from the base blade pressure side 514*b*.

The circumferential sweep of the suction side 516*a* and the pressure side 514*a* may extend from an axis 524 to the blade tip 508*a*. The axis 524 extends through the point at which the suction side 516*a* and the pressure side 514*a* are no longer swept and are collinear with the base blade suction side 516*b* and the base blade pressure side 514*b*, respectively. At the blade tip 508*a*, the amount that the suction side 516*a* is swept in the circumferential direction C is equal to a suction side circumferential sweep 520. The suction side circumferential sweep 520 is defined between a suction side tip edge 520*a* and a base blade suction side tip edge 520*b*. Referring to FIGS. 5A and 5B, the suction side tip edge 520*a* is a substantially axially extending edge of the blade tip 508*a* at the suction side 516*a* and the base blade suction side tip edge 520*b* is a substantially axially extending edge of the base blade tip 508*b* at the base blade suction side 516*b*. By "substantially axially" it is meant that the edge extends more in the axially direction than in either of the radial or circumferential directions. Similarly, at the blade tip 508*a*, the amount that the pressure side 514*a* is swept in the circumferential direction C is equal to a pressure side circumferential sweep 522. The pressure side circumferential sweep 522 is defined between a pressure side tip edge 522*a* and a base blade pressure side tip edge 522*b*. Referring to FIGS. 5A and 5B, the pressure side tip edge 522*a* is a substantially axially extending edge of the blade tip 508*a* at the pressure side 514*a* and the base blade pressure side tip edge 522*b* is a substantially axially extending edge of the base blade tip 508*b* at the base blade pressure side 514*b*.

The suction side circumferential sweep 520 and the pressure side circumferential sweep 522 may be equal. The suction side circumferential sweep 520 is from greater than zero percent to twenty-five percent of the pitch (e.g., FIG. 2, pitch P). The pressure side circumferential sweep 522 is from greater than zero percent to twenty-five percent of the pitch. In some examples, the suction side circumferential sweep 520 or the pressure side circumferential sweep 522, or both, is from two percent to ten percent. As in FIG. 2, the pitch, is the inter-blade spacing defined as the distance between adjacent rotor blades 500*a* at the respective blade tips. Thus, the sweep (either as described with respect to FIG. 5A or 6A) is a percentage of the inter-blade spacing between the rotor blade 500*a* and an adjacent rotor blade upstream or downstream (depending on the direction of sweep). Adjacent means two rotor blades with no intervening rotor blade therebetween.

A span length 526 is defined between the blade tip 508*a* and the blade root 506. The percentage of the span length 526 of the rotor blade 500*a* that exhibits the axial blade sweep is defined by a radial distance 528. The radial distance 528 is defined between the blade tip 508*a* and the axis 524. The radial distance 528 is from greater than zero percent to forty percent of the span length 526. In some examples, the radial distance is from five percent to twenty-five percent of the span length of the rotor blade 500*a*. In some examples, the radial distance is twenty-five percent of the span length of the rotor blade 500*a*.

Figure 6A:
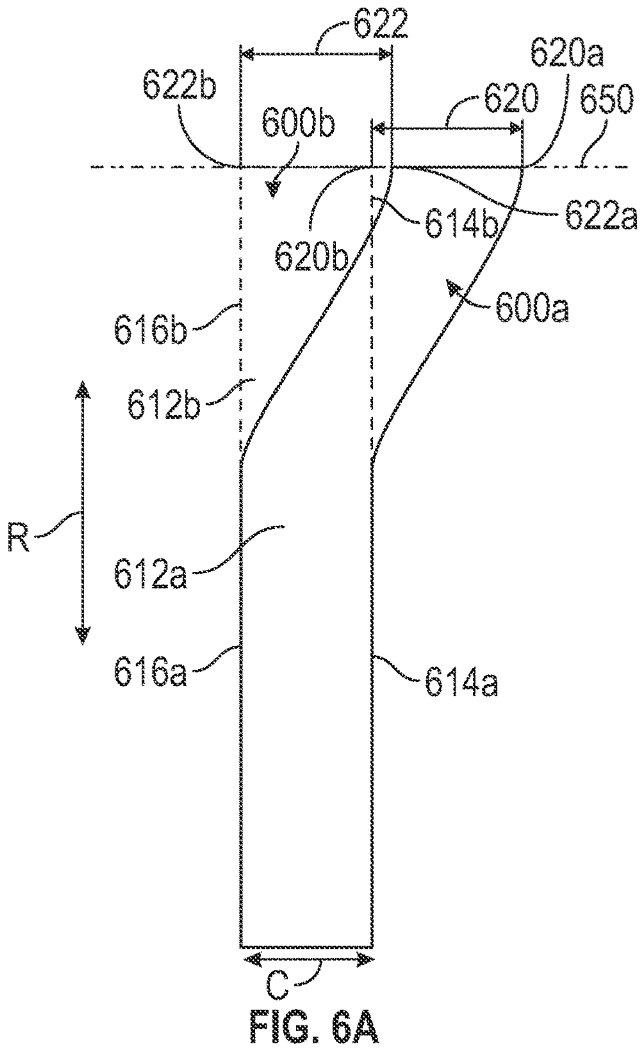
FIG. 6A illustrates a schematic, trailing edge view of a rotor blade, which may be a rotor blade of the rotor blade system of FIG. 2, according to the present disclosure.
Figure 6B:
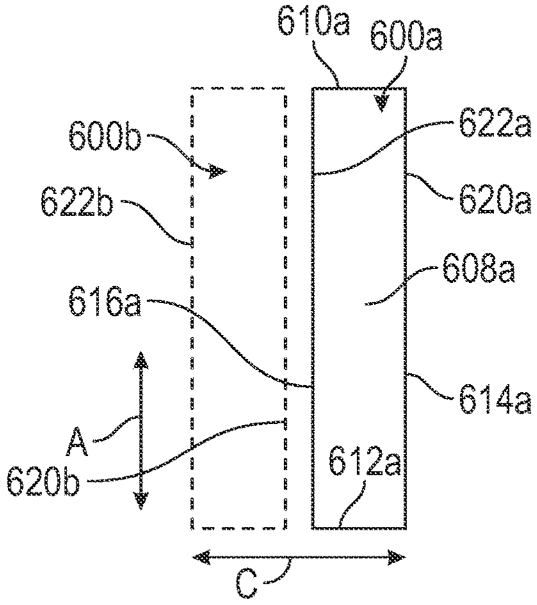
FIG. 6B illustrates a schematic, blade tip view of the rotor blade of FIG. 6A, according to the present disclosure.

FIGS. 6A and 6B illustrate a rotor blade 600*a*. The rotor blade 600*a* has a blade tip 608*a*, a leading edge 610*a*, a trailing edge 612*a*, a pressure side 614*a*, and a suction side 616*a*. FIG. 6A illustrates an aft end view of the rotor blade 600*a* and a base blade 600*b* such that the trailing edge 612*a* of the rotor blade 600*a* and a trailing edge 612*b* of the base blade are visible and the leading edge of each blade is not visible in this view. FIG. 6B illustrates a view of the blade tip 608*a* taken at a plane 650 such that only the blade tip 608*a* and a base blade tip are visible in FIG. 6B. The rotor blade 600*a* is the same as the rotor blade 500*a* of FIGS. 5A and 5B, except that the suction side 616*a* and the pressure side 614*a* of the rotor blade 600*a* are swept in the circumferential direction C in the direction of rotation of the turbine engine 100 (FIG. 1). Accordingly, the full description of FIG. 5A applies to FIG. 6A, except for the direction of the circumferential sweep.

That is, the suction side 616*a* and the pressure side 614*a* are swept in the circumferential direction by a suction side circumferential sweep 620 and a pressure side circumferential sweep 622, respectively, as compared to a base blade suction side 616*b* and a base blade pressure side 614*b* of a base blade 600*b*, respectively. The circumferential sweep is defined according to the definition of FIG. 5A. For example, the suction side circumferential sweep 620 is defined between a suction side tip edge 620*a* and a base blade suction side tip edge 620*b*. Referring to FIGS. 6A and 6B, the suction side tip edge 620*a* is a substantially axially extending edge of the blade tip 608*a* at the suction side 616*a* and the base blade suction side tip edge 620*b* is a substantially axially extending edge of the base blade tip at the base blade suction side 616*b*. The pressure side circumferential sweep 622 is defined between a pressure side tip edge 622*a* and a base blade pressure side tip edge 622*b*. Referring to FIGS. 6A and 6B, the pressure side tip edge 622*a* is a substantially axially extending edge of the blade tip 608*a* at the pressure side 614*a* and the base blade pressure side tip edge 622*b* is a substantially axially extending edge of the base blade tip at the base blade pressure side 614*b*.

The suction side circumferential sweep 620 and the pressure side circumferential sweep 622 may be equal. The suction side circumferential sweep 620 is from greater than zero percent to twenty-five percent. The pressure side circumferential sweep 622 is from greater than zero percent to twenty-five percent. In some examples, the suction side circumferential sweep 620 or the pressure side circumferential sweep 622, or both, is from two percent to ten percent. The percentage of the rotor blade 600*a* that exhibits the circumferential sweep is defined by a radial distance and a sweep point as defined in FIG. 5A. The radial distance is from greater than zero percent to forty percent of the span length of the rotor blade 600*a*. In some examples, the radial distance is from five percent to twenty-five percent of the span length of the rotor blade 500*a*. In some examples, the radial distance is twenty-five percent of the span length of the rotor blade 500*a*. As in prior examples, a chord length (as defined with respect to FIGS. 3A and 3B) is constant (e.g., within ten percent of) between the rotor blade 600*a* and the base blade 600*b* (e.g., as described with respect to FIGS. 3A to 4B). In some examples, a blade thickness (as defined with respect to FIGS. 5A and 5B) of the rotor blade 600*a* is within twenty-five percent of a blade thickness of the base blade 600*b* or is the same as the thickness of the base blade 600*b*.

As illustrated in FIGS. 5B and 6B, the circumferential sweep is such that the blade tip of the rotor blades has no overlap with the base blade tip of the base blades. However, an overlap may be present, such as shown and described with respect to FIG. 8.

As described previously, FIGS. 3A to 4B illustrate an axial chord sweep of the rotor blades and FIGS. 5A to 6B illustrate a circumferential sweep of the rotor blades. Although the examples are described separately, any combination of the sweeps may be provided in one or more of the rotor blades (e.g., rotor blades 204 described with respect to FIG. 2).

Figure 7:
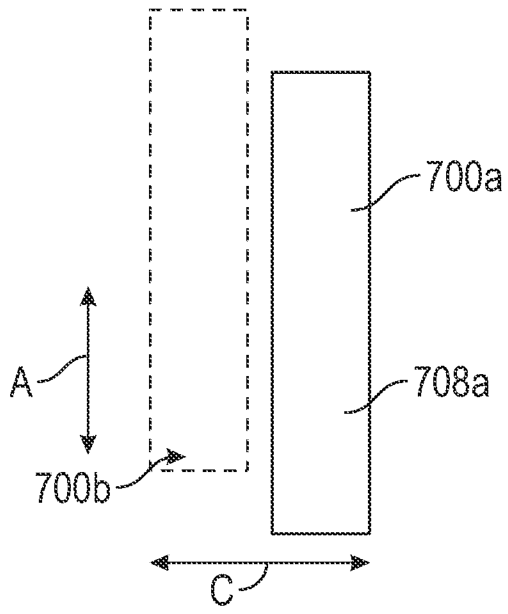
FIG. 7 illustrates a schematic, blade tip view of a rotor blade having a combination of blade sweeps, which may be the rotor blade system of FIG. 2, according to the present disclosure.
Figure 8:
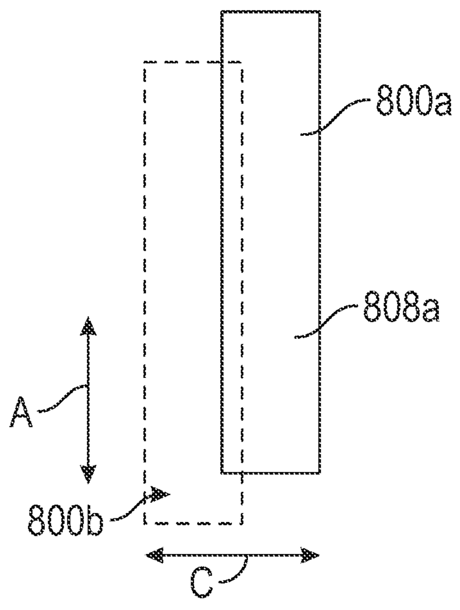
FIG. 8 illustrates a schematic, blade tip view of a rotor blade having a combination of blade sweeps, which may be the rotor blade system of FIG. 2, according to the present disclosure.

For example, as shown in the top views of FIGS. 7 and 8 (which are views of a blade tip 708*a* and a blade tip 808*a*, respectively), a rotor blade may be swept both axially and circumferentially as compared to a base blade. Each of FIGS. 7 and 8 is taken at a plane extending through the blade tips such that only the blade tip 708*a*, 808*a* and a base blade tip are visible. The particular example of FIG. 7 illustrates an axially forward sweep and a circumferential sweep the direction of rotation of the engine of a rotor blade 700*a* as compared to a base blade 700*b*. The particular example of FIG. 8 illustrates an axially aft sweep and a circumferential sweep in the direction of rotation of the engine of a rotor blade 800*a* as compared to a base blade 800*b*. Furthermore, in the example of FIG. 7, the circumferential sweep is such that there is no overlap between the base blade 700*b* and the rotor blade 700*a* at the blade tip 708*a*, while, in the example of FIG. 8, the circumferential sweep is such that there is overlap between the base blade 800*b* and the rotor blade 800*a* at the blade tip 808*a*. Likewise, rotor blades may exhibit circumferential sweep in the opposite direction of rotation with either an axially forward sweep or an axially aft sweep. In this example, there may or may not be overlap between the base blade and the rotor blade at the blade tip.

These are just two exemplary combinations, and the combination may exhibit in other manners. For example, the rotor blades may have an axially aft sweep and a circumferential sweep in the direction of rotation of the engine, and an axially forward sweep and a circumferential sweep in the direction opposite of rotation of the engine, or an axially forward sweep and a circumferential sweep in the direction of rotation of the engine. In any of these combinations, the circumferential sweep may or may not include an overlap at the blade tip.

Furthermore, as noted previously, any of the examples of FIGS. 3A to 8 may be applied to one or more of the rotor blades 204 (FIG. 2). In some examples, the same swept blade arrangement is provided to all of the one or more of the rotor blades 204. In some examples, more than one, different, swept blade arrangement is provided to one or more of the rotor blades 204.

Although the base rotor blades herein are illustrated in FIGS. 3A to 8 as parallelepipeds, these images are schematic only and other shapes are contemplated. That is, for example, the base rotor blade may have a twist or other contour to the blade, such as shown and described with respect to FIG. 2. The rotor blade of the present disclosure is then swept from the base blade, maintaining any original twist or contour of the base blade.

Accordingly, the rotor blades of the present disclosure change the airfoil shape without meaningfully adding material or removing material. That is, the sweep described herein does not add material or remove material from the rotor blade. No meaningful addition of material or removal material means that the chord length of the swept rotor blade is within ten percent of the base blade, the blade thickness of the swept rotor blade is within twenty-five percent of the base blade, or both the chord length of the swept rotor blade is within ten percent of the base blade and the blade thickness of the swept rotor blade is within twenty-five percent of the base blade.

As illustrated and described herein, the leading edge and the trailing edge are swept in the same direction (e.g., either forward or aft) and the pressure side and the suction side are swept in the same direction (e.g., either in the direction of rotation or opposite the direction of rotation). In some examples, however, the sweep may be in different directions as long as the chord (for axial sweep) or thickness (for circumferential sweep) is maintained within ten percent of that of the base blade.

Further aspects are provided by the subject matter of the following clauses.

A rotor blade system for a turbine engine having a longitudinal centerline axis includes a rotor configured to rotate about the longitudinal centerline axis, and a plurality of rotor blades coupled circumferentially around the rotor, each rotor blade having a leading edge, a trailing edge, a suction side, and a pressure side. At least one rotor blade of the plurality of rotor blades has a leading edge axial sweep of the leading edge as compared to a leading edge of a base blade of the plurality of rotor blades and a trailing edge axial sweep of the trailing edge as compared to a trailing edge of the base blade of the plurality of rotor blades.

The rotor blade system of the preceding clause, wherein the leading edge axial sweep is equal to the trailing edge axial sweep.

The rotor blade system of any preceding clause, wherein the leading edge axial sweep and the trailing edge axial sweep extend in a forward direction of the turbine engine.

The rotor blade system of any preceding clause, wherein the leading edge axial sweep and the trailing edge axial sweep extend in an aft direction of the turbine engine.

The rotor blade system of any preceding clause, wherein the at least one rotor blade includes a blade tip and a blade root, and the base blade includes a base blade tip and a base blade root, and there is an overlap between the blade tip and the base blade tip.

The rotor blade system of any preceding clause, wherein the at least one rotor blade includes a blade tip and a blade root, and the base blade includes a base blade tip and a base blade root, and there is no overlap between the blade tip and the base blade tip.

The rotor blade system of any preceding clause, wherein the base blade comprises a twist, and the at least one rotor blade comprises the same twist as that of the base blade.

The rotor blade system of any preceding clause, wherein the at least one rotor blade has no addition or removal of material or minimal addition or removal of material as compared to the base blade.

The rotor blade system of any preceding clause, wherein the at least one rotor blade comprises all of the plurality of rotor blades.

The rotor blade system of any preceding clause, wherein the at least one rotor blade comprises multiple rotor blades and the multiple rotor blades are arranged in a predetermined pattern about the rotor with a plurality of base blades.

The rotor blade system of any preceding clause, wherein the predetermined pattern is an alternating pattern.

The rotor blade system of any preceding clause, wherein the at least one rotor blade of the plurality of rotor blades further comprises a circumferential sweep in an inter-blade spacing defined between the at least one rotor blade of the plurality of rotor blades and an adjacent rotor blade of the plurality of rotor blades.

The rotor blade system of any preceding clause, wherein a pitch is defined between a blade tip of adjacent rotor blades of the plurality of rotor blades, and the circumferential sweep is from greater than zero percent to twenty-five percent of the pitch.

The rotor blade system of any preceding clause, wherein the at least one rotor blade defines a chord length between the leading edge and the trailing edge, and wherein the leading edge axial sweep or the trailing edge axial sweep is from greater than zero percent to fifteen percent of the chord length.

The rotor blade system of any preceding clause, wherein the leading edge axial sweep or the trailing edge axial sweep is from five percent to ten percent of the chord length.

The rotor blade system of any preceding clause, wherein the at least one rotor blade defines a span length between a blade tip and a blade root, and the leading edge axial sweep or the trailing edge axial sweep is from greater than zero percent to forty percent of the span length.

The rotor blade system of any preceding clause, wherein the leading edge axial sweep or the trailing edge axial sweep is from five percent to twenty-five percent of the span length.

The rotor blade system of any preceding clause, wherein the at least one rotor blade defines a chord length between the leading edge and the trailing edge, the base blade defines a base blade chord length between a leading edge of the base blade and a trailing edge of the base blade, and the chord length is within ten percent of the base blade chord length.

The rotor blade system of any preceding clause, wherein the chord length is equal to the base blade chord length.

The rotor blade system of any preceding clause, further comprising a circumferential sweep, wherein the circumferential sweep is in a direction of rotation of the turbine engine.

The rotor blade system of any preceding clause, further comprising a circumferential sweep, wherein the circumferential sweep is in a direction opposite of rotation of the turbine engine.

The rotor blade system of any preceding clause, further comprising a circumferential sweep, and wherein the leading edge axial sweep and the trailing edge axial sweep are in a forward direction of the turbine engine and the circumferential sweep is in a direction of rotation of the turbine engine.

The rotor blade system of any preceding clause, further comprising a circumferential sweep, and wherein the leading edge axial sweep and the trailing edge axial sweep are in a forward direction of the turbine engine and the circumferential sweep is in a direction opposite of rotation of the turbine engine.

The rotor blade system of any preceding clause, further comprising a circumferential sweep, and wherein the leading edge axial sweep and the trailing edge axial sweep are in an aft direction of the turbine engine and the circumferential sweep is in a direction of rotation of the turbine engine.

The rotor blade system of any preceding clause, further comprising a circumferential sweep, and wherein the leading edge axial sweep and the trailing edge axial sweep are in an aft direction of the turbine engine and the circumferential sweep is in a direction opposite of rotation of the turbine engine.

The rotor blade system of any preceding clause, wherein the circumferential sweep is from greater than zero percent to forty percent of the span length.

The rotor blade system of any preceding clause, wherein the circumferential sweep is from five percent to twenty-five percent of the span length.

The rotor blade system of any preceding clause, wherein the circumferential sweep is from two percent to ten percent of the pitch.

The rotor blade system of any preceding clause, wherein the at least one rotor blade includes a blade tip and a blade root, the base blade includes a base blade tip and a base blade root, and the blade tip and the blade root are coplanar with the base blade tip and the base blade root, respectively.

The rotor blade system of any preceding clause, wherein there is no sweep at the blade root.

The rotor blade system of any preceding clause, wherein the at least one rotor blade defines a blade thickness between the leading edge and the trailing edge, the base blade defines a base blade thickness length between a leading edge of the base blade and a trailing edge of the base blade, and the blade thickness is within twenty-five percent of the base blade thickness.

The rotor blade system of the preceding clause, wherein the blade thickness is equal to the base blade thickness.

The rotor blade system of any preceding clause, further comprising a sweep point on the leading edge, wherein the leading edge axial sweep occurs from the sweep point to the blade tip and wherein the leading edge of the at least one rotor blade and a leading edge of the base blade are collinear from the sweep point to the blade root.

The rotor blade system of any preceding clause, further comprising a sweep point on the trailing edge, wherein the trailing edge axial sweep occurs from the sweep point to the blade tip and wherein the trailing edge of the at least one rotor blade and a trailing edge of the base blade are collinear from the sweep point to the blade root.

The rotor blade system of any preceding clause, further comprising a radial distance extending from a blade tip to a sweep point defining a point at which the leading edge axial sweep ceases and the leading edge of the at least one rotor blade is collinear with a leading edge of the base blade.

The rotor blade system of the preceding clause, wherein the radial distance is from greater than zero percent to forty percent of the span length of the at least one rotor blade.

The rotor blade system of the preceding clause, wherein the radial distance is five percent to twenty five percent of the span length of the last one rotor blade.

A rotor blade system for a turbine engine having a longitudinal centerline axis includes a rotor configured to rotate about the longitudinal centerline axis, and a plurality of rotor blades coupled circumferentially around the rotor, each rotor blade having a leading edge, a trailing edge, a suction side, and a pressure side. At least one rotor blade of the plurality of rotor blades has a suction side circumferential sweep of the suction side as compared to a suction side of a base blade of the plurality of rotor blades and a pressure side circumferential sweep of the pressure side as compared to a pressure side of the base blade of the plurality of rotor blades.

The rotor blade system of the preceding clause, wherein the suction side circumferential sweep is equal to the pressure side circumferential sweep.

The rotor blade system of any preceding clause, wherein the suction side circumferential sweep and the pressure side circumferential sweep extend in a direction of rotation of the turbine engine.

The rotor blade system of any preceding clause, wherein the suction side circumferential sweep and the pressure side circumferential sweep extend in an opposite direction of rotation of the turbine engine.

The rotor blade system of any preceding clause, wherein the at least one rotor blade includes a blade tip and a blade root, and the base blade includes a base blade tip and a base blade root, and there is an overlap between the blade tip and the base blade tip.

The rotor blade system of any preceding clause, wherein the at least one rotor blade includes a blade tip and a blade root, and the base blade includes a base blade tip and a base blade root, and there is no overlap between the blade tip and the base blade tip.

The rotor blade system of any preceding clause, wherein the base blade comprises a twist, and the at least one rotor blade comprises the same twist as that of the base blade.

The rotor blade system of any preceding clause, wherein the at least one rotor blade has no addition or removal of material or minimal addition or removal of material as compared to the base blade.

The rotor blade system of any preceding clause, wherein the at least one rotor blade comprises all of the plurality of rotor blades.

The rotor blade system of any preceding clause, wherein the at least one rotor blade comprises multiple rotor blades and the multiple rotor blades are arranged in a predetermined pattern about the rotor with a plurality of base blades.

The rotor blade system of any preceding clause, wherein the predetermined pattern is an alternating pattern.

The rotor blade system of any preceding clause, wherein the circumferential sweep is defined in an inter-blade spacing defined between the at least one rotor blade of the plurality of rotor blades and an adjacent rotor blade of the plurality of rotor blades.

The rotor blade system of any preceding clause, wherein a pitch is defined between a blade tip of adjacent rotor blades of the plurality of rotor blades, and the circumferential sweep is from greater than zero percent to twenty-five percent of the pitch.

The rotor blade system of any preceding clause, wherein the circumferential sweep is from two percent to ten percent of the pitch.

The rotor blade system of any preceding clause, wherein the at least one rotor blade defines a span length between a blade tip and a blade root, and the suction side circumferential sweep or the pressure side circumferential sweep is from greater than zero percent to forty percent of the span length.

The rotor blade system of any preceding clause, wherein the suction side circumferential sweep or the pressure side circumferential sweep is from five percent to twenty-five percent of the span length.

The rotor blade system of any preceding clause, wherein the at least one rotor blade defines a chord length between the leading edge and the trailing edge, the base blade defines a base blade chord length between a leading edge of the base blade and a trailing edge of the base blade, and the chord length is within ten percent of the base blade chord length.

The rotor blade system of any preceding clause, wherein the chord length is equal to the base blade chord length.

The rotor blade system of any preceding clause, further comprising an axial sweep, wherein the axial sweep is in a forward direction of the turbine engine.

The rotor blade system of any preceding clause, further comprising an axial sweep, wherein the axial sweep is in an aft direction of the turbine engine.

The rotor blade system of any preceding clause, further comprising an axial sweep, and wherein the axial sweep is in a forward direction of the turbine engine and the suction side circumferential sweep and the pressure side circumferential sweep are in a direction of rotation of the turbine engine.

The rotor blade system of any preceding clause, further comprising an axial sweep, and wherein the axial sweep is in a forward direction of the turbine engine and the suction side circumferential sweep, and the pressure side circumferential sweep are in a direction opposite of rotation of the turbine engine.

The rotor blade system of any preceding clause, further comprising an axial sweep, and wherein the axial sweep is in an aft direction of the turbine engine and the suction side circumferential sweep, and the pressure side circumferential sweep are in a direction of rotation of the turbine engine.

The rotor blade system of any preceding clause, further comprising an axial sweep, and wherein the axial sweep is in an aft direction of the turbine engine and the suction side circumferential sweep, and the pressure side circumferential sweep are in a direction opposite of rotation of the turbine engine.

The rotor blade system of any preceding clause, wherein the axial sweep is from greater than zero percent to forty percent of the span length.

The rotor blade system of any preceding clause, wherein the axial sweep is from five percent to twenty-five percent of the span length.

The rotor blade system of any preceding clause, wherein the at least one rotor blade defines a chord length between the leading edge and the trailing edge, and wherein the axial sweep is from greater than zero percent to fifteen percent of the chord length.

The rotor blade system of any preceding clause, wherein the axial sweep is from five percent to ten percent of the chord length.

The rotor blade system of any preceding clause, wherein the axial sweep includes a leading edge axial sweep that is equal to a trailing edge axial sweep.

The rotor blade system of any preceding clause, wherein the leading edge axial sweep and the trailing edge axial sweep extend in a forward direction of the turbine engine.

The rotor blade system of any preceding clause, wherein the leading edge axial sweep and the trailing edge axial sweep extend in an aft direction of the turbine engine.

The rotor blade system of any preceding clause, wherein the at least one rotor blade includes a blade tip and a blade root, the base blade includes a base blade tip and a base blade root, and the blade tip and the blade root are coplanar with the base blade tip and the base blade root, respectively.

The rotor blade system of any preceding clause, wherein there is no sweep at the blade root.

The rotor blade system of any preceding clause, wherein the at least one rotor blade defines a blade thickness between the leading edge and the trailing edge, the base blade defines a base blade thickness length between a leading edge of the base blade and a trailing edge of the base blade, and the blade thickness is within twenty-five percent of the base blade thickness.

The rotor blade system of the preceding clause, wherein the blade thickness is equal to the base blade thickness.

The rotor blade system of any preceding clause, further comprising a sweep point on the suction side, wherein the suction side circumferential sweep occurs from the sweep point to the blade tip and wherein the suction side of the at least one rotor blade and a suction side of the base blade are collinear from the sweep point to the blade root.

The rotor blade system of any preceding clause, further comprising a sweep point on the pressure side, wherein the pressure side circumferential sweep occurs from the sweep point to the blade tip and wherein the pressure side of the at least one rotor blade and a pressure side of the base blade are collinear from the sweep point to the blade root.

The rotor blade system of any preceding clause, further comprising a radial distance extending from a blade tip to a sweep point defining a point at which the suction side circumferential sweep ceases and the suction side of the at least one rotor blade is collinear with a suction side of the base blade.

The rotor blade system of the preceding clause, wherein the radial distance is from greater than zero percent to forty percent of the span length of the at least one rotor blade.

The rotor blade system of the preceding clause, wherein the radial distance is five percent to twenty five percent of the span length of the last one rotor blade.

A turbine engine comprising the rotor blade system of any preceding clause.

The turbine engine of the preceding clause, further comprising a low-pressure turbine, wherein the rotor blade system is included in at least one stage of the low-pressure turbine.

The turbine engine of any preceding clause, further comprising a high-pressure turbine, wherein the rotor blade system is included in at least one stage of the high-pressure turbine.

The turbine engine of any preceding clause, further comprising a low-pressure compressor, wherein the rotor blade system is included in at least one stage of the low-pressure compressor.

The turbine engine of any preceding clause, further comprising a high-pressure compressor, wherein the rotor blade system is included in at least one stage of the high-pressure compressor.

The turbine engine of any preceding clause, further comprising a fan, wherein the rotor blade system is included in the fan.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A rotor blade system for a turbine engine having a longitudinal centerline axis, the rotor blade system comprising:

a rotor configured to rotate about the longitudinal centerline axis; and a plurality of rotor blades coupled circumferentially around the rotor, each rotor blade having a leading edge, a trailing edge, a suction side, and a pressure side, wherein at least one rotor blade of the plurality of rotor blades is a base blade, the base blade defining a base blade chord length between a leading edge of the base blade and a trailing edge of the base blade, and wherein at least one rotor blade of the plurality of rotor blades is a swept blade, the swept blade having a leading edge axial sweep of the leading edge of the swept blade as compared to the leading edge of the base blade of the plurality of rotor blades and a trailing edge axial sweep of the trailing edge of the swept blade as compared to the trailing edge of the base blade of the plurality of rotor blades and defining a swept blade chord length between the leading edge of the swept blade and the trailing edge of the swept blade, wherein the swept blade chord length is a constant chord length with respect to the base blade chord length.

2. The rotor blade system of claim 1, wherein the leading edge axial sweep is equal to the trailing edge axial sweep.

3. The rotor blade system of claim 1, wherein the leading edge axial sweep and the trailing edge axial sweep extend in a forward direction of the turbine engine.

4. The rotor blade system of claim 1, wherein the leading edge axial sweep and the trailing edge axial sweep extend in an aft direction of the turbine engine.

5. The rotor blade system of claim 1, wherein the swept blade includes a blade tip and a blade root, and the base blade includes a base blade tip and a base blade root, and there is an overlap between the blade tip and the base blade tip.

6. The rotor blade system of claim 1, wherein the swept blade includes a blade tip and a blade root, and the base blade includes a base blade tip and a base blade root, and there is no overlap between the blade tip and the base blade tip.

7. The rotor blade system of claim 1, wherein the base blade comprises a twist, and the swept blade comprises a same twist as that of the base blade.

8. The rotor blade system of claim 1, wherein the swept blade has no addition or removal of material or minimal addition or removal of material as compared to the base blade.

9. The rotor blade system of claim 1, wherein the swept blade comprises multiple rotor blades and the multiple rotor blades are arranged in a predetermined pattern about the rotor with a plurality of base blades.

10. The rotor blade system of claim 9, wherein the predetermined pattern is an alternating pattern.

11. The rotor blade system of claim 1, wherein the swept blade of the plurality of rotor blades further has a circumferential sweep in an inter-blade spacing defined between the swept blade of the plurality of rotor blades and an adjacent rotor blade of the plurality of rotor blades.

12. The rotor blade system of claim 11, wherein a pitch is defined between a blade tip of adjacent rotor blades of the plurality of rotor blades, and the circumferential sweep is greater than zero percent and less than or equal to twenty-five percent of the pitch.

13. The rotor blade system of claim 1, wherein the leading edge axial sweep or the trailing edge axial sweep is greater than zero percent and less than or equal to fifteen percent of the swept blade chord length.

14. The rotor blade system of claim 13, wherein the leading edge axial sweep or the trailing edge axial sweep is from five percent to ten percent of the swept blade chord length.

15. The rotor blade system of claim 1, wherein the swept blade defines a span length between a blade tip and a blade root, and the leading edge axial sweep or the trailing edge axial sweep is greater than zero percent and less than or equal to forty percent of the span length.

16. The rotor blade system of claim 15, wherein the leading edge axial sweep or the trailing edge axial sweep is from five percent to twenty-five percent of the span length.

17. The rotor blade system of claim 1, wherein the swept blade chord length is equal to the base blade chord length.

18. A turbine engine having a longitudinal centerline axis, the turbine engine comprising:

a rotor blade system comprising:

a rotor configured to rotate about the longitudinal centerline axis; and a plurality of rotor blades coupled circumferentially around the rotor, each rotor blade having a leading edge, a trailing edge, a suction side, and a pressure side, a low-pressure turbine, a high-pressure turbine, a low-pressure compressor, and a high-pressure compressor; and a fan, wherein the rotor blade system is included in at least one stage of at least one of the low-pressure turbine, the high-pressure turbine, the low-pressure compressor, the high-pressure compressor, or the fan, and wherein at least one rotor blade of the plurality of rotor blades is a base blade, the base blade defining a base blade chord length between a leading edge of the base blade and a trailing edge of the base blade, and wherein at least one rotor blade of the plurality of rotor blades is a swept blade, the swept blade having a leading edge axial sweep of the leading edge of the swept blade as compared to the leading edge of the base blade of the plurality of rotor blades and a trailing edge axial sweep of the trailing edge of the swept blade as compared to the trailing edge of the base blade of the plurality of rotor blades and defining a swept blade chord length between the leading edge of the swept blade and the trailing edge of the swept blade, wherein the swept blade chord length is a constant chord length with respect to the base blade chord length.

* * * * *